Aug. 12, 1952  N. J. VAN NES  2,606,508
MEANS FOR HANDLING FREIGHT
Filed Feb. 24, 1950  2 SHEETS—SHEET 1
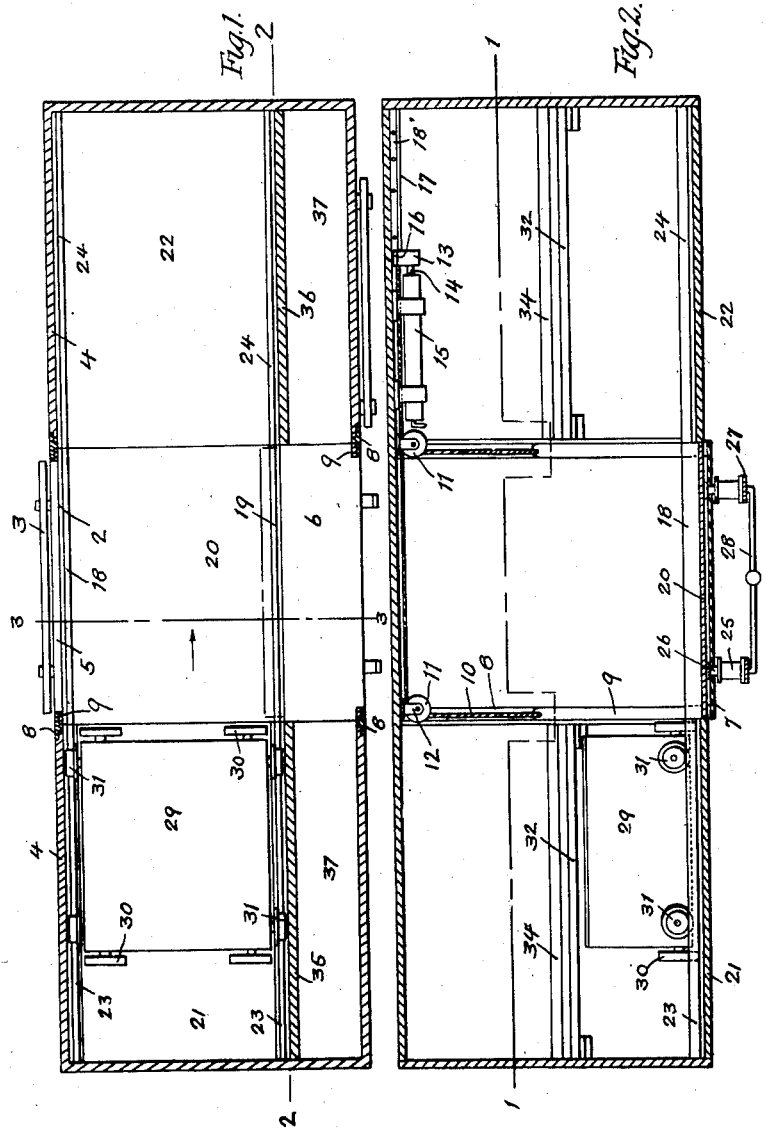
Inventor
N. J. van Nes
By Egerton R. Case
Attorney.

Aug. 12, 1952  N. J. VAN NES  2,606,508
MEANS FOR HANDLING FREIGHT

Filed Feb. 24, 1950  2 SHEETS—SHEET 2

Inventor
N. J. van Nes
By
Attorney

Patented Aug. 12, 1952

2,606,508

UNITED STATES PATENT OFFICE 2,606,508

MEANS FOR HANDLING FREIGHT

Nicolas John van Nes, Eldersley,
Saskatchewan, Canada

Application February 24, 1950, Serial No. 146,003

4 Claims. (Cl. 105—366)

This invention relates to means for handling freight placed in or on carriers of any kind provided with two sets of wheels of different diameters, and the objects of the invention are:

1. To provide means to facilitate the handling of freight, by reducing to a minimum the time required to load and unload freight of all kinds, in bulk or broken lots; reduce to a minimum mistakes in putting off freight at the wrong station and avoid breakages.

2. To dispense with any type of fixed loading facilities and unloading equipment at points along a given road for handling heavy freight.

3. To economize space in freight cars through providing simple means to place the carrier-held freight compactly therein, whether on the floor of the car or above this floor, as hereinafter more particularly explained.

Figure 1 is a horizontal longitudinal section on the line 1—1, Figure 2, with certain parts omitted, showing a plan view of a carrier within the car, and the lift and the drop centre thereof.

Figure 2 is a vertical longitudinal section on the line 2—2, Figure 1, showing means to raise and lower the lift.

Figure 5 is a detail of construction hereinafter referred to.

In the drawings like characters of reference refer to the same parts.

Figure 4:
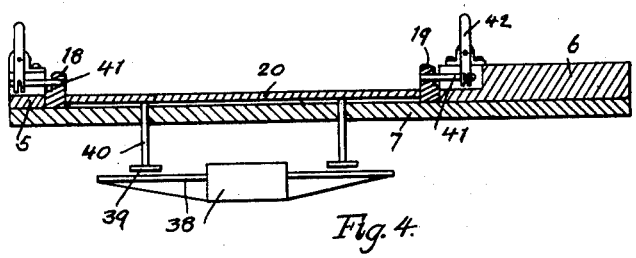
Figure 4 is a longitudinally vertical section through the lift, showing an alternative means to move the drop centre of the lift.

This invention can be adapted for use on any type of freight car or motor truck, since, under certain conditions, the lift frame carrying the drop centre need not necessarily be vertically moveable itself. For instance, flat freight cars would not need a lift.

A box type of freight car has been schematically shown to illustrate the principle of this invention, with aligned doorways in the sides thereof.

The term "carrier" is used in the specification and claims as defining a truck or container of any kind adapted to be carried alternately on two sets of different types of wheels of different diameters, carried thereby.

The wheels of greater diameter may be provided with rubber tyres of any suitable kind, if desired.

In the drawings have been illustrated footwalks or passageways down one side of the car for the convenience and safety of the freight handler, though they are not essential to this invention.

When a carrier is being loaded before it is finally placed for storage or transportation on a freight car, it will be supported on its larger wheels, and as it is being placed in final position, it will be lowered to be run on the smaller wheels over tracks or rails while the larger wheels will be suspended above the floor or other support for the rails for the smaller wheels.

Obviously the carrier may be made in various sizes and of large enough capacity to obviate the use of any upper deck in the freight car.

The drop centre of the lift is raised and lowered independently of the means used to raise and lower the lift as a whole.

The under frame and trucks of the freight car are not shown in the drawings, since they are not germane to this invention.

The centrally-placed doorways 2, with the usual sliding doors 3, are shown in the freight car 4, illustrated to disclose this invention. Only one door may be used and it may be in the side of the car or at the end thereof, or there may be a door at the side of the car and also at the end. But the position of the doorways 2, is preferred since a car may be loaded and unloaded more expeditiously with the lift located between these doorways and more or less centrally of the car.

Where the lift is located the floor of the car is removed as shown in Figure 2.

The lift comprises any suitable construction of frame to support the drop centre. In the form shown the frame consists of two members 5, and 6, extending longitudinally of the car the length of the drop centre. These members are tied together by a bottom plate which forms the base 7 of the lift and this base extends longitudinally of the freight car the same distance said members extend.

Figure 5:
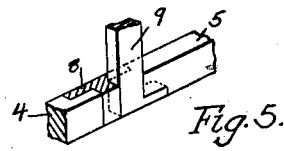

Carried by the side walls of the car at each side of the doorway 2, is a vertical T-shaped post 8. The vertical bars 9, are carried by the members 5 and 6, at each corner of the lift (Figure 5) and are vertically guided by the posts 8, as the lift is raised and lowered. Attached to each bar 9, is a cable 10. These cables pass over idlers 11, journalled in the brackets 12, carried by the car above the bars 9. These cables are attached to the end 13, of the piston-rod 14, operating in the air cylinder 15, suitably supported from the roof of the car at each side thereof, or longitudinally centrally of the car.

In this case, only one cylinder may be used. The end 13, of each piston-rod 14, has a flange 16, which slides along the flange 17, of a plate 18', supported by the car at each side of the cylinder 15. By means of the compressed air from the braking system of the car the piston-rod is moved to raise the lift. There is nothing novel in the means illustrated and described to raise and lower the lift, and any suitable means may be used for this purpose.

Carried by the base 7, and adjacent to the members 5 and 6, are rails 18, and 19, lying parallel thereto longitudinally of the car. These rails are of the same length as the members 5, and 6 and are carried by the base 7, and the top sides thereof are in the same plane as the top sides of the members 5, and 6.

Positioned between the rails 18, and 19, and vertically guided thereby, is the drop centre 20, of the lift. As shown in Figures 1 and 2, the drop centre 20, when the floor of the car where it is located has been removed, moves adjacent each section of the floor remaining after the removal of part of the floor.

Carried by the sections 21, and 22, of the floor of the car are pairs of rails 23, and 24. A rail 23, is in alignment with rail 24, of each pair, and of course these rails are in alignment with the rails 18, and 19 (Figure 1) and are normally close thereto, when the parts are in the position shown in Figure 3.

Any suitable means may be used to vertically move the drop centre 20, independently of the other parts of the lift. One of the means shown comprises several pairs of cylinders 25, the pistons 26 of which pass through a base 7, and are suitably attached to the under side of the drop centre 20. These cylinders are suitably supported by braces 27, attached to the base 7, and are supplied with air from the air tank of the car (not shown) by the valve-controller piping 28.

The carrier 29 is a unitary structure and is provided with two pairs of land wheels 30 adapted to run over plane surfaces, one pair being located at each end of the carrier, and two pairs of flanged wheels 31 adapted to run on rails or tracks, one pair being located on each side of the carrier.

The wheels 30 are of uniform diameter and essentially extend below the bottom of the carrier and below the lowest part of the wheels 31.

After a carrier has been loaded, it is run onto a truck on wheels 30, and then to mount the carrier in a freight car the truck may be backed to a freight platform, or backed up to a freight car. The carrier 29 can then be rolled on its wheels 30, from the truck onto the platform or directly into the car onto the drop centre 20, over the member 6. During this shifting of the carrier (Figure 3), the drop centre is held in the same plane as that of the members 5 and 6, and the top of the rails 18 and 19. When the wheels 31 are above these rails, the drop centre 20 is lowered to permit the wheels 31 to rest on the said rails, and it continues to be lowered until the drop centre is below the wheels 30 (see dotted lines, Figure 3). Then the freight handler runs the carrier off the rails 18 and 19 onto the rails 23 or 24, as the case may be, thus storing it well back in the car (Figures 1 and 2).

When shifting the carrier off the lift, of course the rails 18 and 19 are fully in alignment with the rails 23 and 24.

The top of the rails 23 and 24 is positioned sufficiently above the floor of the car so that the wheels 30 will move clear of same (Figure 2).

Figure 3:
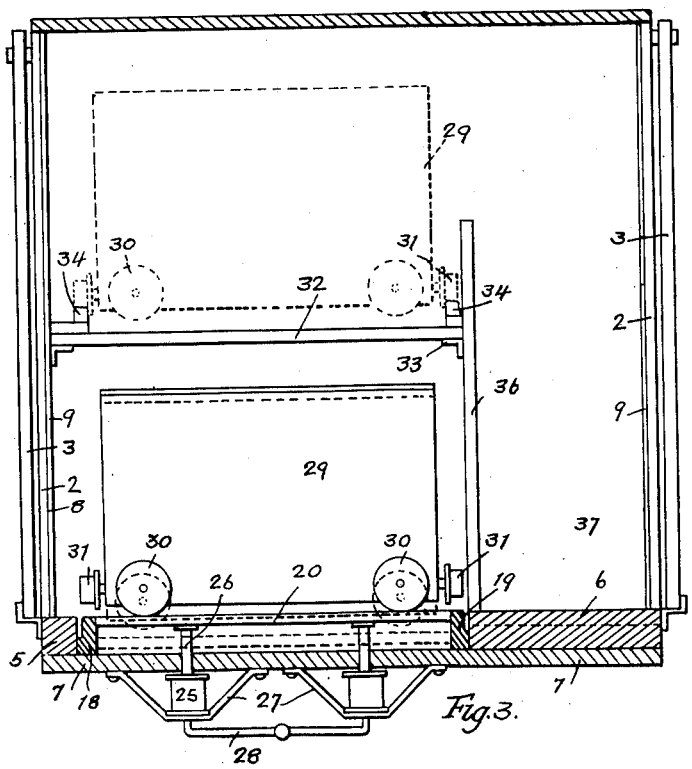
Figure 3 is an enlarged vertical section on the line 3—3, Figure 1, without the means to raise and lower the lift.

A freight car may be provided with decks whereby carriers may be placed one above the other (Figure 3).

A deck may be of any suitable construction. As shown in Figure 3 it comprises a floor 32, supported by brackets 33, or otherwise. This floor supports rails 34, the top of which is far enough above the said floor that when the rails 18 and 19, on the lift, are brought fully into alignment therewith, the carrier may be moved onto the deck over the rails 34 without the wheels 30 touching the floor 32.

Partition walls 35 and 36 may be placed in the car spaced apart from one of the side walls of the car, thus forming passageways 37, for the convenience and safety of the freight handler. In Figure 3 the wall 36 is shown as carrying one of the brackets 33. However, these walls are not essential.

A part 38 of the under frame of a freight car may be used to lift the drop centre 20 up to the same plane as the top of the rails 18 and 19 for loading the lift when the lift is lowered down far enough for the foot 39 of the rods 40 to contact the frame part 38. By means of slidable bolts 41 controlled by levers 42, pivoted to supports carried by the members 5 and 6, the drop centre is held in elevated position. These bolts are slid by the freight handler through the rails 18 and 19, at the proper time, underneath the drop centre and are likewise slid reversely when it is desired that the drop centre drop by its own weight below the top of the rails 18 and 19, to permit the carrier to be run off the lift over the rails 18 and 19, without touching it.

Obviously, to remove a carrier from a freight car, the rails 18 and 19 must be wholly in the same plane as the rails 23 or 24, and the drop centre 20 well below the top of the rails 18 and 19.

While herein has been described the preferred form of construction illustrated in the drawings of the novel features of the invention, it must be understood that no limitations in construction is intended thereby that will in anywise narrow the scope of protection as defined by the claims.

I claim:

1. The combination with a freight car provided with at least one doorway in one side thereof, and one pair of spaced rails extending longitudinally of the car from each end thereof to the doorway area, of a solely vertically-movable plane support within said car permanently in said doorway area, a rail adjacent each side of said support and lying parallel thereto and permanently in alignment with the first-mentioned rails, means to support said second-mentioned rails, and means, at times, to hold said plane support in the same plane as that occupied by the tops of said second-mentioned rails, and at times whereby said support may be solely moved vertically below the top of said second-mentioned rails.

2. The combination with a freight car provided with at least one doorway in one side thereof, and at least one pair of spaced rails extending longitudinally of the car from each end thereof to the doorway area, of a lift located within said car in alignment with said doorway area, comprising a unitary frame provided with a pair of spaced rails fixedly carried thereby and extending longitudinally of the car to be aligned with the rails in the car, means to support said frame, a drop centre located between the rails carried by said frame, means to vertically move said lift as a whole, a deck carried within said car laterally of said doorway area, a pair of spaced rails carried by said deck longitudinally of said car, the lift to be raised to place its rails in alignment with the rails on said deck, and means to vertically move said drop centre independently of said lift.

3. A carrier of unitary structure exteriorly provided beyond each corner at each end thereof with a pair of wheels having fixed axes of rotation at right angles to each other and above the bottom of the carrier, one of the wheels of each pair being a land wheel and the other a flanged wheel, the diameter of the land wheels being greater than the diameter of the flanged wheels.

4. In combination a freight car provided with at least one doorway in one side thereof and one pair of spaced rails lying longitudinally of the car from each end thereof to the doorway area; a plane support within said car permanently in said doorway area; a rail adjacent each side of said support and lying parallel thereto and in alignment with the first-mentioned rails; means to support said second-mentioned rails in the same plane as that occupied by the tops of said second mentioned rails; a carrier of unitary structure exteriorly provided beyond each corner at each end thereof with a pair of wheels having fixed axes of rotation at right angles to each other, one of the wheels of each pair being a land wheel and the other a flanged wheel, the diameter of the land wheels being greater than the diameter of the flanged wheels, the carrier adapted to be rolled on its land wheels over said plane support when this latter is in the same plane as the tops of said second-mentioned rails to place its flanged wheels above said second-mentioned rails, and means to lower said plane support to permit the flanged wheels to rest on said second-mentioned rails and permit the carrier to be run onto the first-mentioned rails back into the car.

NICOLAS JOHN van NES.

REFERENCES CITED

The following references are of record in the file of this patent:

UNITED STATES PATENTS

| Number | Name | Date |
|---|---|---|
| 413,063 | Howard | Oct. 15, 1889 |
| 658,142 | Dunn | Sept. 18, 1900 |
| 765,211 | Thompson | July 19, 1904 |
| 1,392,451 | Rowe | Oct. 4, 1921 |
| 1,444,145 | Estergreen | Feb. 6, 1923 |
| 1,586,783 | Coffey | June 1, 1926 |
| 1,727,114 | Oechsle | Sept. 3, 1929 |